United States Patent
Pafchek

(10) Patent No.: US 11,611,190 B2
(45) Date of Patent: Mar. 21, 2023

(54) TECHNIQUE FOR OPTIMIZING COUPLING TO OPTICAL FIBERS

(71) Applicant: Thorlabs, Inc., Newton, NJ (US)

(72) Inventor: Robert M Pafchek, Blandon, PA (US)

(73) Assignee: Thorlabs, Inc., Newton, NJ (US)

( * ) Notice: Subject to any disclaimer, the term of this patent is extended or adjusted under 35 U.S.C. 154(b) by 394 days.

(21) Appl. No.: 16/829,338

(22) Filed: Mar. 25, 2020

(65) Prior Publication Data
US 2020/0313381 A1    Oct. 1, 2020

Related U.S. Application Data

(60) Provisional application No. 62/823,229, filed on Mar. 25, 2019.

(51) Int. Cl.
| | | |
|---|---|---|
| *H01S 3/067* | (2006.01) | |
| *G02B 6/32* | (2006.01) | |
| *G02B 6/26* | (2006.01) | |
| *G02B 6/255* | (2006.01) | |
| *H01S 3/00* | (2006.01) | |
| *G02B 6/42* | (2006.01) | |
| *G02B 6/25* | (2006.01) | |

(52) U.S. Cl.
CPC ........ *H01S 3/06725* (2013.01); *G02B 6/2551* (2013.01); *G02B 6/262* (2013.01); *G02B 6/32* (2013.01); *G02B 6/25* (2013.01); *G02B 6/4207* (2013.01); *H01S 3/0057* (2013.01)

(58) Field of Classification Search
CPC ........ G02B 6/262; G02B 6/32; G02B 6/4207; H01S 3/0057; H01S 3/06725
See application file for complete search history.

(56) References Cited

U.S. PATENT DOCUMENTS

| | | | |
|---|---|---|---|
| 6,853,785 B2 * | 2/2005 | Dunn | G02B 6/13 385/37 |
| 2009/0169859 A1 | 7/2009 | Biteau et al. | |
| 2014/0319708 A1 | 10/2014 | Thind et al. | |
| 2019/0193208 A1 * | 6/2019 | Kalli | B23K 26/0648 |

FOREIGN PATENT DOCUMENTS

| | | |
|---|---|---|
| WO | 2005111677 A2 | 11/2005 |
| WO | 2013067647 A1 | 5/2013 |
| WO | 2018042441 A1 | 3/2018 |

OTHER PUBLICATIONS

First Notification of Office Action issued by the China National Intellectual Property Administration for Chinese Patent Application No. 202010209842.3, dated Feb. 8, 2022, with English translation attached.

Office Action issued by the Canadian Intellectual Property Office for Canadian Patent Application No. 3076707, dated Mar. 16, 2022.

European Search Report, dated Jul. 28, 2020, 9 pages.

* cited by examiner

*Primary Examiner* — Daniel Petkovsek

(74) *Attorney, Agent, or Firm* — Myers Wolin, LLC

(57) ABSTRACT

A method of optimizing the coupling to an optical fiber, including: generating a femtosecond laser pulse; directing a focus of the laser pulse to a longitudinal depth in the region beneath the endface of the optical fiber to generate microvoids; adjusting the intensity of the laser pulse at different depths, such that a refractive index profile is created in the region beneath the endface of the optical fiber.

20 Claims, 3 Drawing Sheets

TECHNIQUE FOR OPTIMIZING COUPLING TO OPTICAL FIBERS

CROSS REFERENCES TO RELATED APPLICATIONS

This application claims the benefit of U.S. Provisional Patent Application No. 62/823,229 filed on Mar. 25, 2019. The disclosure and entire teachings of U.S. Provisional Patent Application 62/823,229 are hereby incorporated by reference.

FIELD OF THE INVENTION

The present disclosure generally relates to optical elements, and more particularly to techniques for optimizing the coupling to optical fibers.

BACKGROUND

Currently anti-reflecting (AR) coatings are typically fabricated by depositing thin films at high vacuum levels. These layers require precise control of the thickness to achieve the desired spectrum. Delamination is also a concern and can also due to improper surface preparation or residual stresses in the film stack due to differences in thermal expansion coefficients of the various materials. Any residual species present during the deposition can also lead to absorption of the optical power and subsequent failure of the film. The choice of film material can also lead to material absorption which can limit the working wavelength range of the device or also cause absorption which results in film failure. Therefore, it is necessary to have many materials and subsequent processes to satisfy the need to provide solutions across a wide wavelength range.

The reflected power can also be reduced by creating a textured surface at the fiber endface. By gradually tapering the material to minimize the abrupt index change at the fiber/air interface. These "motheye" type structures have been demonstrated but require modification to the optical surface which may be problematic for complex material systems. Additionally, it complicates any attempts to clean that surface or potentially splice the fiber.

Therefore, there is a long-felt need for a robust process to manufacture stable AR coatings across all wavelength bands capable of withstanding high optical power. It is also desirable to have a process relatively independent of material or wavelength and capable of easily fabricating features in fiber or cable in addition to modifying the surface of bulk optics. Furthermore, there is a need for a similar process to treat fusion spliced optical fibers and a process to create customer numerical aperture for better mode couplings.

SUMMARY

An embodiment of the invention uses femtosecond laser pulses to generate microvoids to create a longitudinal refractive index gradient/profile just beneath the fiber endface. These features will allow devices to be fabricated capable of high power propagation over a broad wavelength band with low reflectivity. It also avoids modifying the surface of the material, making it more robust and manufacturable than current "motheye" type designs. Furthermore, since the transmission window will not be limited by the choice of coating material it will determined by the intrinsic transmission characteristics of the base material. These features can be added to the structure either in the fiber or after cabling.

An embodiment of the present disclosure provides a method of creating an anti-reflecting region beneath an endface of an optical fiber, including: generating a femtosecond laser pulse; directing a focus of the laser pulse to a longitudinal depth in the region beneath the endface of the optical fiber; adjusting the intensity of the laser pulse at different positions in the fiber, such that a longitudinal refractive index gradient from the endface to the longitudinal depth below the endface is created in the region beneath the endface of the optical fiber.

An embodiment of the present invention provides a method of creating an anti-reflecting splice interface of a spliced optical fiber, including: generating a femtosecond laser pulse; directing a focus of the laser pulse to a longitudinal depth in one or both regions next to the splice interface of the spliced optical fiber to generate microvoids; adjusting the intensity of the laser pulse at different positions in the fiber, such that a longitudinal refractive index gradient from the interface to the longitudinal depth beyond the interface is created in the one or both regions.

An embodiment of the present invention provides a method of improving a mode coupling of an optical fiber, including: generating a femtosecond laser pulse; directing a focus of the laser pulse to a longitudinal depth in the region beneath the endface of the optical fiber to generate microvoids; adjusting the intensity of the laser pulse at different positions in the fiber, such that a radial refractive index profile from the center to the side surface of the fiber is created in the region beneath the endface of the optical fiber.

Another embodiment of the present invention provides an optical fiber including an anti-reflecting region beneath an endface; wherein the region beneath the endface has a longitudinal refractive index gradient from the endface to a longitudinal depth below the endface.

Another embodiment of the present invention provides a spliced optical fiber including a splice interface; wherein one or both regions next to the splice interface has a longitudinal refractive index gradient from the interface to a longitudinal depth beyond the interface.

Another embodiment of the present invention provides an optical fiber including a custom numerical aperture region beneath an endface; wherein the region beneath the endface has a radial refractive index profile from the center to the side surface of the fiber.

DETAILED DESCRIPTION OF THE PREFERRED EMBODIMENTS

Figure 1:
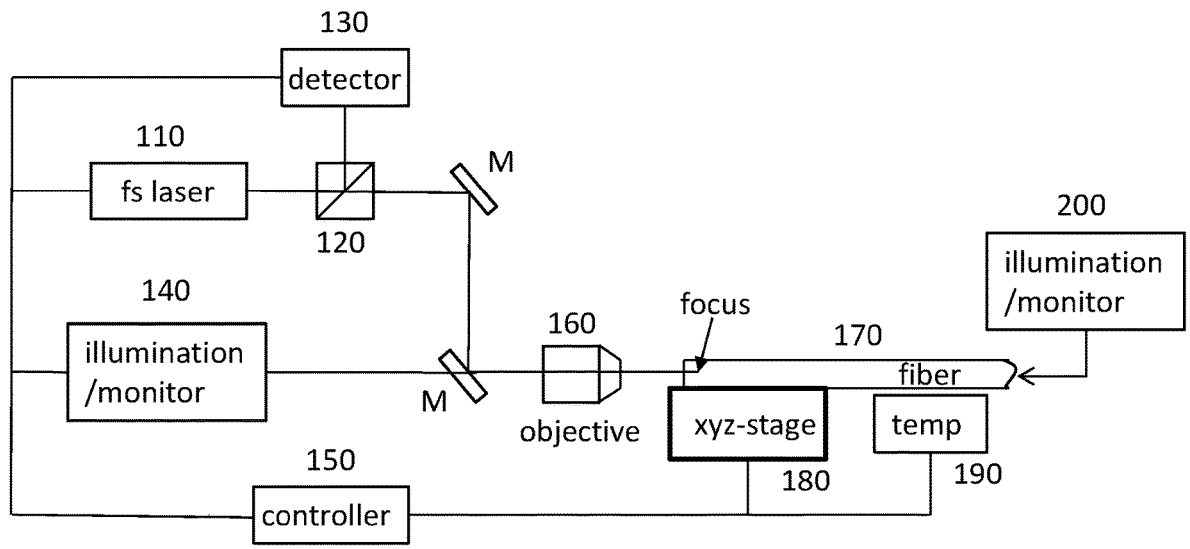
FIG. 1 illustrates a setup for fabricating an AR coating on an endface of an optical fiber according to one embodiment of the present disclosure.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 2:
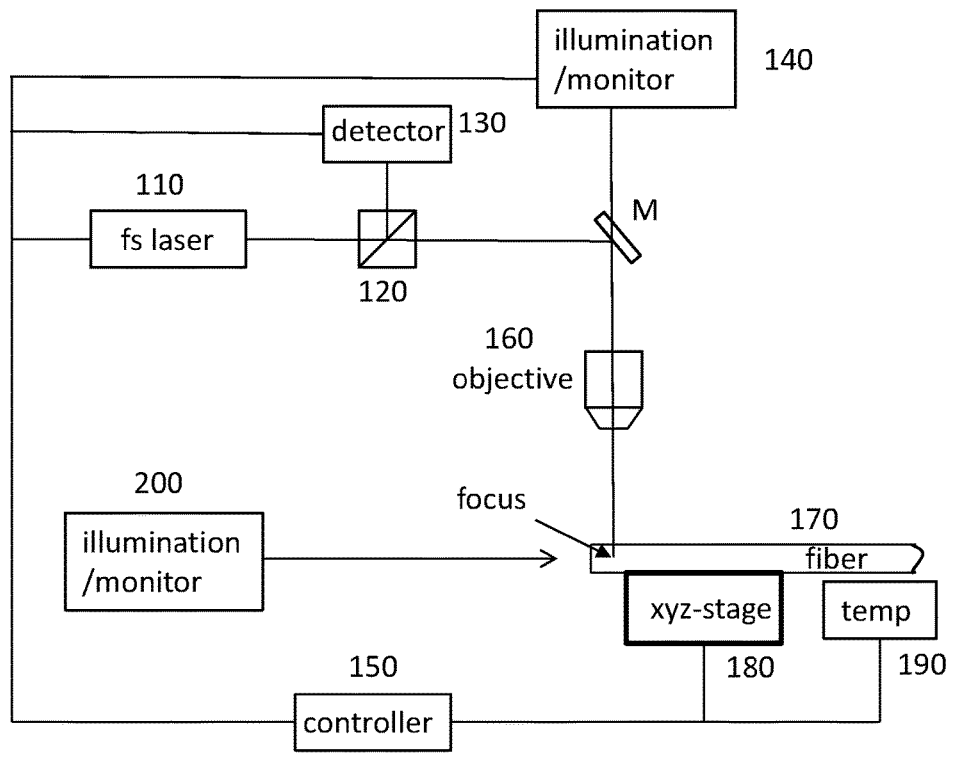
FIG. 2 illustrates another setup for fabricating an AR coating on an endface of an optical fiber according to one embodiment of the present disclosure.

FIG. 1 illustrates a schematic diagram of fabrication an AR coating on an endface of an optical fiber according to one embodiment of the present disclosure. FIG. 2 illustrates a schematic diagram of another embodiment in which the laser beam enters through the side of the fiber.

As shown in FIG. 1, a femtosecond laser 110 generates a laser pulse beam towards a beam splitter 120. A portion of the beam is directed to a detector 130 to detect the intensity of the laser beam. A controller 150 is used controls the intensity of the laser beam. The beam is reflected by the mirrors M to an objective 160. The objective focuses the beam below the endface of an optical fiber 170. The optical fiber is mounted on a xyz-stage 180. The location of the focal point of the laser beam is monitored by one or more optical elements 140, 200 for illuminating and/or monitoring the features created in the fiber. For example, the optical element may include an illuminating source such as a LED, and an image detector, such as a CCD. It is understood that the optical elements used and their placement depend on the specific application and the overall optical setup. The controller 150 controls the movement of the stage so that the laser beam is focused at a desired point in the fiber cross-section to generate microvoids. The optical mode of the fiber will interact with the features formed by individual voids or collections of voids to achieve the desired effect. In one embodiment, the controller 150 adjusts the temperature control device 190 so as to optimize the temperature at which the microvoids are formed to minimize the attenuation or maximize the optical damage threshold.

In one embodiment, a light beam is directed to the microvoids and the interaction of the light beam and the microvoids is observed by the monitor, and the controller dynamically and actively adjusts the intensity and/or location of the laser pulse to optimize the performance of the fiber based on the observation.

The depth of the focus may be adjusted by moving the stage in the longitudinal direction of the fiber. Alternatively, the objective may move in the longitudinal direction of the fiber instead. The cross-sectional area of the fiber may be covered by moving the stage in a transversal direction. Other scanning methods to cover the cross section are also contemplated.

In the embodiment shown in FIG. 2, the optical elements are arranged such that the laser beam enters through the side of the fiber. The controller 150 controls the movement of the stage and/or the objective so that the laser beam is focused at a desired point within the fiber. It is contemplated that other arrangement of the optical elements are possible as long as the focus of the laser beam can be brought to a desired location within the fiber by some movement of the stage and/or the objective.

Figure 3:
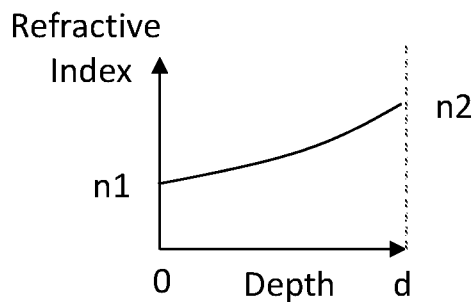
FIG. 3 illustrates an optical fiber having an AR coating on an endface according to one embodiment of the present disclosure.
Figure 3:

The laser pulses generated by the femtosecond laser 110 create microvoids below the endface of the fiber 170. The laser pulses cause a change in refractive index in the fiber where the pulses are focused. By changing the intensities at different depth, a longitudinal refractive index gradient region 310 is created, as illustrated in FIG. 3. For illustration purposes, the refractive index gradient function is also shown in FIG. 3. The example function shows that the refractive index changes gradually from n1 at the surface to n2 at a desired depth d. It is contemplated that the refractive index gradient function may be a straight line, step function, Gaussian, quintic, sinusoidal, exponential, etc. In a preferred embodiment, the refractive indices should match those of their respective interfaces. For example, n1 should be close to the index of air, and n2 should be close to the index of the fiber. For a specified wavelength range, the depth d should be chosen to minimize the reflection at the endface. Numerical analysis may be used to determine the optimal depth value.

In one embodiment, the microvoids are created at a specified depth beneath the endface using the above method. Then, the anti-reflection surface may be obtained by polishing the endface or cleaving a portion of the fiber based on the specified depth to optimize the performance.

In one embodiment, the microvoids features can be formed without removing the optical coating of the fiber, although some applications may involve processing outside the limitations imposed by the coating properties. In this case the coating can be selectively removed and the fiber recoated once the processing is complete.

Figure 4:
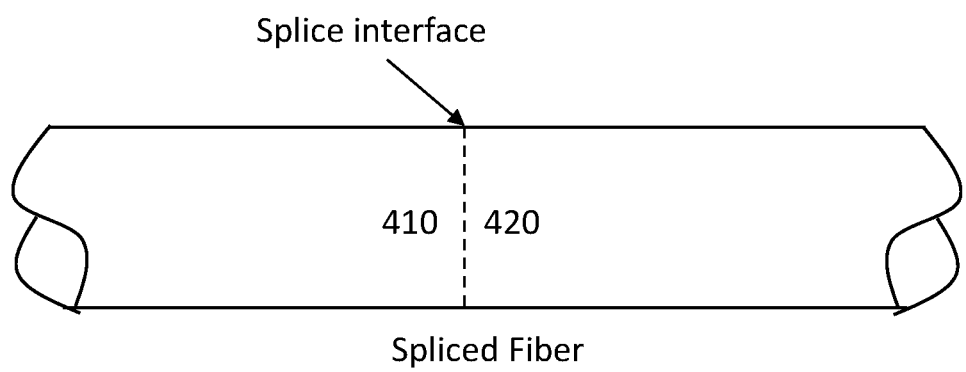
FIG. 4 illustrates a spliced optical fiber having AR regions next to the splice interface according to one embodiment of the present disclosure.

In one embodiment, an anti-reflection splice interface may be created in a spliced fiber. In the case of spliced fiber the index of the cores should be matched to minimize power loss due to reflection. As shown in FIG. 4, on each side of the splice interface, there are regions 410 and 420 respectively, one or both of which can include the microvoids features by the laser pulse treatment discussed above. For the spliced fiber, the microvoids may be created closer to the interface.

The present technique according to an embodiment of the invention could also be used to tailor fiber mode coupling by locally controlling the fiber numerical aperture (NA) and be applied to any material system including silica fiber. These features can be written into the fiber after fusion splicing avoiding any complications associated with thermal processing while allowing real time monitoring to optimize performance.

Figure 5:
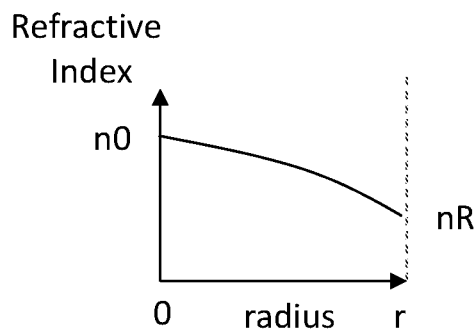
FIG. 5 illustrates an optical fiber having a tailored numerical aperture according to one embodiment of the present disclosure.
Figure 5:
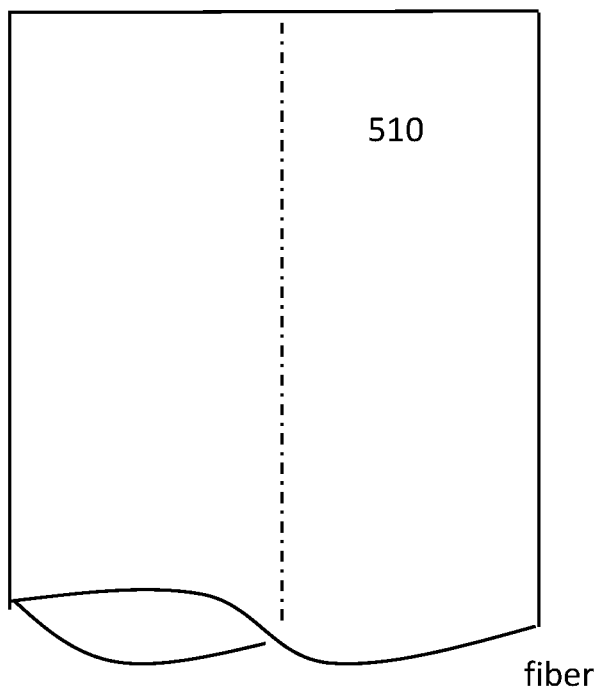

In one embodiment, the above method is used to locally adjust the numerical aperture (NA) of the fiber for better optical coupling by generating microvoids in a region 510 beneath the endface of the fiber such that a desired refractive index profile in the radial direction of the fiber is created, as illustrated in FIG. 5. For illustration purposes, the refractive index profile function is also shown in FIG. 5. The example function shows that the refractive index changes gradually from n0 at the center to nR at the cross-section of radius R of the fiber. It is contemplated that the refractive index profile function may be a straight line, step function, Gaussian, quintic, sinusoidal, exponential, etc. Note that a combination of the refractive index profiles in both the longitudinal and radial directions as shown FIGS. 3 and 5 is contemplated.

Creating microvoids below the surface to taper the index avoids having to alter the optical surface and protects the structure once formed. Gratings created with these microvoids have been shown to be stable over time and under exposure to high power making them an attractive candidate for this application. These features can be readily formed in fiber, cable and bulk optics.

Once developed, the microvoid process should be stable and robust based on the history of gratings fabricated with this technology. Furthermore, the technique should have wide applicability to wavelength and material systems since these microvoids do not have an intrinsic absorption and will not increase the exposed surface area. It may also be possible to tailor the device properties by adjusting the microvoid size, geometry and density along the feature length or across the aperture of the device.

All of these attributes make this a versatile technique with wide ranging implications. In addition to AR coating and mode coupling, the present technique may apply to different material systems, bulk applications, etc.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

What is claimed is:

1. A method of creating an anti-reflecting region beneath an endface of an optical fiber, comprising the actions of:
   generating a femtosecond laser pulse;
   directing a focus of the laser pulse to a longitudinal depth in the region beneath the endface of the optical fiber to generate microvoids; and
   adjusting an intensity of the laser pulse at different positions in the optical fiber, such that a longitudinal refractive index gradient from the endface to the longitudinal depth below the endface is created in the region beneath the endface of the optical fiber.

2. The method of claim 1, wherein the optical fiber is mounted on a 3-dimensional stage and the stage moves the optical fiber so that the focus of the laser pulse is at a desired longitudinal depth, and a transversal location.

3. The method of claim 2, further comprising monitoring the transversal location of the focus of the laser pulse.

4. The method of claim 3, wherein the movement of the stage is based on the monitored location of the focus of the laser pulse.

5. The method of claim 1, further comprising monitoring the intensity of the laser pulse.

6. The method of claim 5, wherein the adjusting of the intensity of the laser is based on the monitored intensity.

7. The method of claim 1, wherein the depth of the focus is adjusted by moving an objective.

8. The method of claim 1, wherein the depth of the focus is adjusted by moving a stage.

9. The method of claim 1, further comprising adjusting a temperature at which the microvoids are formed to achieve a desired attenuation or optical damage threshold.

10. The method of claim 1, further comprising polishing the endface or cleaving a portion of the fiber from the endface based on a specified depth beneath the endface where the microvoids are formed.

11. A method of creating an anti-reflecting splice interface of a spliced optical fiber, wherein the spliced optical fiber comprises two parts that have been spliced together at the splice interface, the method comprising the actions of:
   generating a femtosecond laser pulse;
   directing a focus of the laser pulse to a longitudinal depth in one or both regions next to the splice interface of the spliced optical fiber to generate microvoids; and
   adjusting an intensity of the laser pulse at different positions in the spliced optical fiber, such that a longitudinal refractive index gradient from the splice interface to the longitudinal depth beyond the splice interface is created in the one or both regions.

12. The method of claim 11, wherein the optical fiber is mounted on a 3-dimensional stage and the stage moves the optical fiber so that the focus of the laser pulse is at a desired longitudinal depth, and a transversal location.

13. The method of claim 12, further comprising monitoring the transversal location of the focus of the laser pulse.

14. The method of claim 13, wherein the movement of the stage is based on the monitored location of the focus of the laser pulse.

15. The method of claim 11, further comprising monitoring the intensity of the laser pulse.

16. The method of claim 15, wherein the adjusting of the intensity of the laser is based on the monitored intensity.

17. The method of claim 11, wherein the depth of the focus is adjusted by moving an objective.

18. The method of claim 11, wherein the depth of the focus is adjusted by moving a stage.

19. The method of claim 11, further comprising adjusting a temperature at which the microvoids are formed to achieve a desired attenuation or optical damage threshold.

20. The method of claim 11, further comprising polishing the endface or cleaving a portion of the fiber from the endface based on a specified depth beneath the endface where the microvoids are formed.

* * * * *